March 11, 1941.  F. A. COOLEY  2,234,426
CONTROL PANEL AND POWER CONTROL FOR VEHICLE DOOR INSTRUMENTALITIES
Filed July 5, 1938  4 Sheets-Sheet 3

INVENTOR.
Floyd A. Cooley
BY Barnes, Kisselle, Laughlin & Raisch
ATTORNEYS.

March 11, 1941. F. A. COOLEY 2,234,426
CONTROL PANEL AND POWER CONTROL FOR VEHICLE DOOR INSTRUMENTALITIES
Filed July 5, 1938 4 Sheets-Sheet 4
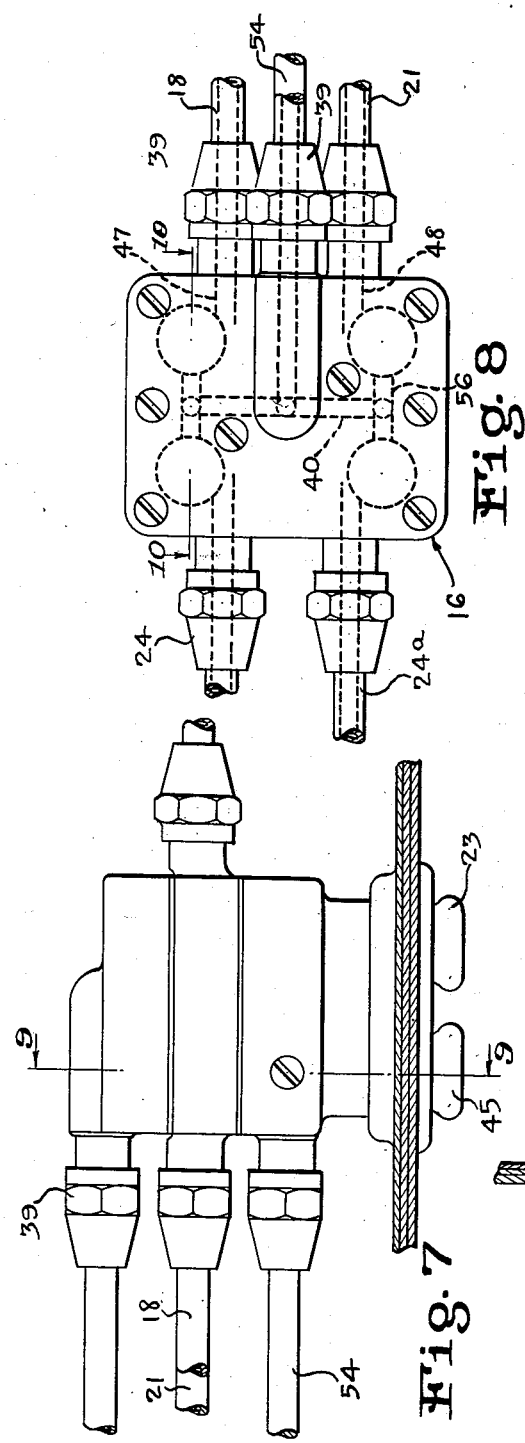
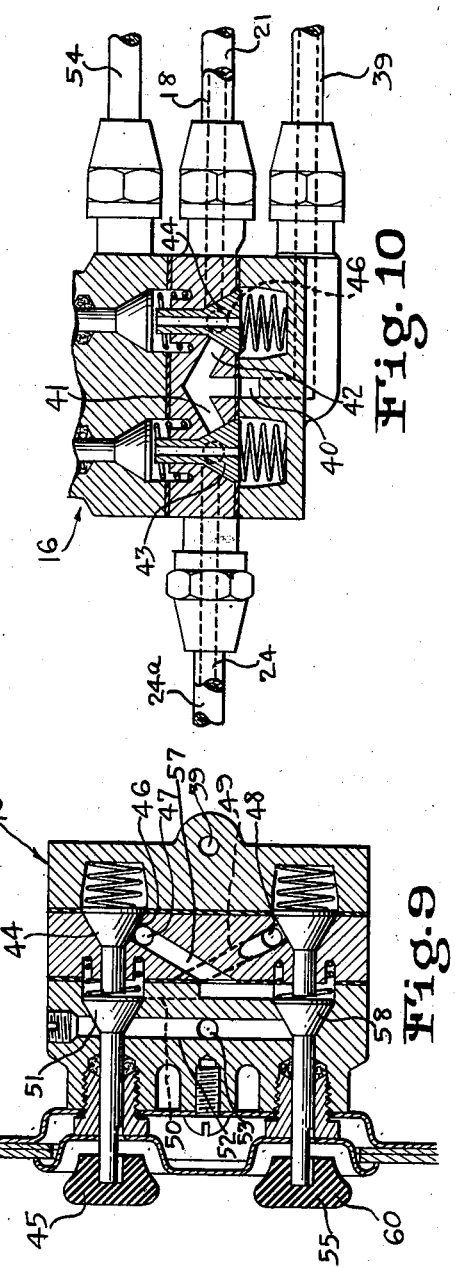
INVENTOR.
Floyd A. Cooley
BY Barnes, Kisselle, Laughlin & Raisch
ATTORNEYS.

Patented Mar. 11, 1941

2,234,426

UNITED STATES PATENT OFFICE 2,234,426

CONTROL PANEL AND POWER CONTROL FOR VEHICLE DOOR INSTRUMENTALITIES

Floyd A. Cooley, Detroit, Mich., assignor to Ternstedt Manufacturing Company, Detroit, Mich., a corporation of Michigan Application July 5, 1938, Serial No. 217,478

1 Claim. (Cl. 296—44)

In the so-called "Fisher no draft" ventilating system described and claimed in the Fisher Patent No. 2,048,605, it is customary to operate the sliding window panel with one regulator and to operate the swinging panel with a second regulator. All automobile doors are now operated by remote control handles. The grouping and location of these three different handles on an automobile door is somewhat of a problem. They have to be conveniently located to be easily reached. The door lock handle should be located so that it can be used as a pull-to handle, if possible, and the regulator handles have to be located in proximity to the apparatus which they operate. Furthermore, the designer has left the problem of the various handles getting in the way of the operator's knees, or his hands, or elbows, in operating the steering wheel. The result is that many of the installations are rather unsatisfactory compromises that have to be made in view of all the factors.

It is the object of the present invention to provide a group panel which contains control devices by which all of these instrumentalities may be separately operated from a remote point by the aid of power, preferably hydraulic. This completely does away with the undesirable location of the hand controls which have to be governed, more or less, by the location of the instrumentalities which they control. With this panel control, the control buttons can be located anywhere that is convenient for the reach and it is in no way compromised by reason of having to be contiguous to the instrumentality which they control. Furthermore, the button control does away with hand manipulation and gives a real touch of luxury to the operation of all the instrumentalities contained in a door.

In the drawings:

Fig. 7 is a top elevation of the valve casing for the four valves that control the two window panels.

Fig. 8 is a rear elevation of the same.

Fig. 9 is a section on the line 9—9 of Fig. 7.

Fig. 10 is a section on the line 10—10 of Fig. 8.

Figure 3:
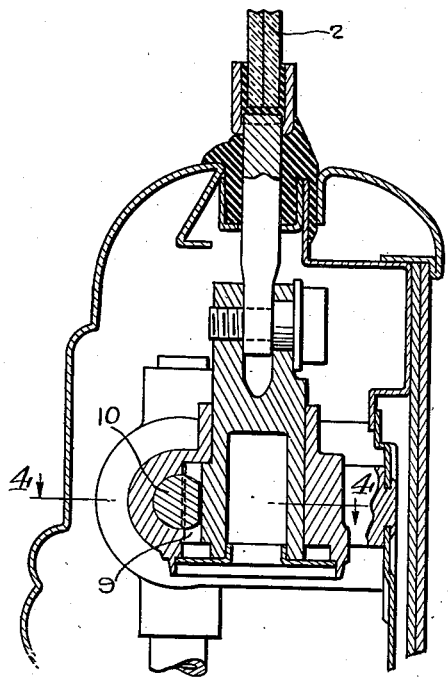
Fig. 3 is a section on the line 3—3 of Fig. 1.
Figure 4:
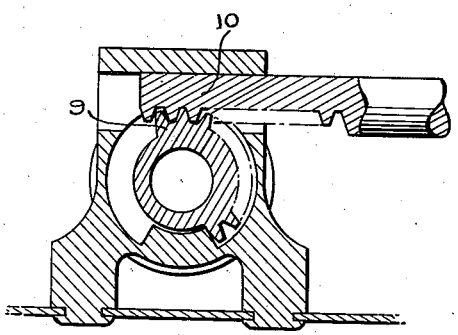
Fig. 4 is a section on the line 4—4 of Fig. 3.

1 is the vertical sliding window of the "Fisher no draft" setup and 2 is the swinging panel or wind wing. The sliding panel is operated by the swinging arm 3, together with an auxiliary arm 4 which has an X relation with the swinging arm. The ends of the auxiliary arm are provided with lift pins—one pin 5 traveling in the guide 6 and the other pin 7 traveling in the window bracket guide 8. This is a cross arm regulator that is already described and claimed in the Graf Patent No. 2,010,075 and the Lakin et al. Patent No. 1,892,731. The wind wing 2 is operated by a pinion 9 operated by a rack 10 (see Figs. 3 and 4). The coach lock 11 is not shown in detail but is preferably of such a semi-freewheeling lock as is shown and described in the Andersen and Bowlus Patent No. 2,039,873.

Figure 1:
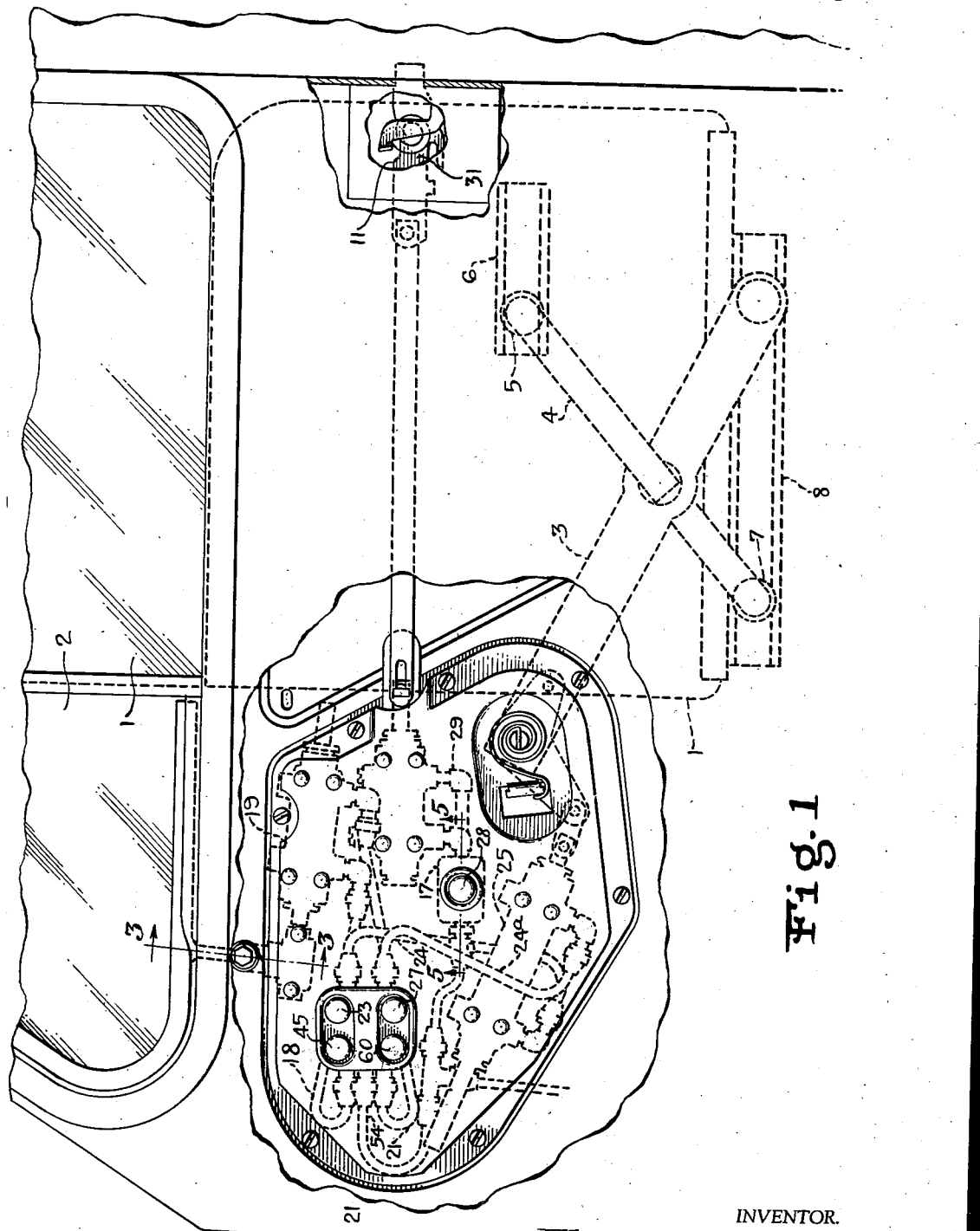
Fig. 1 is an inside elevation of an automobile door with part of the panel broken away to show the control panel.
Figure 2:
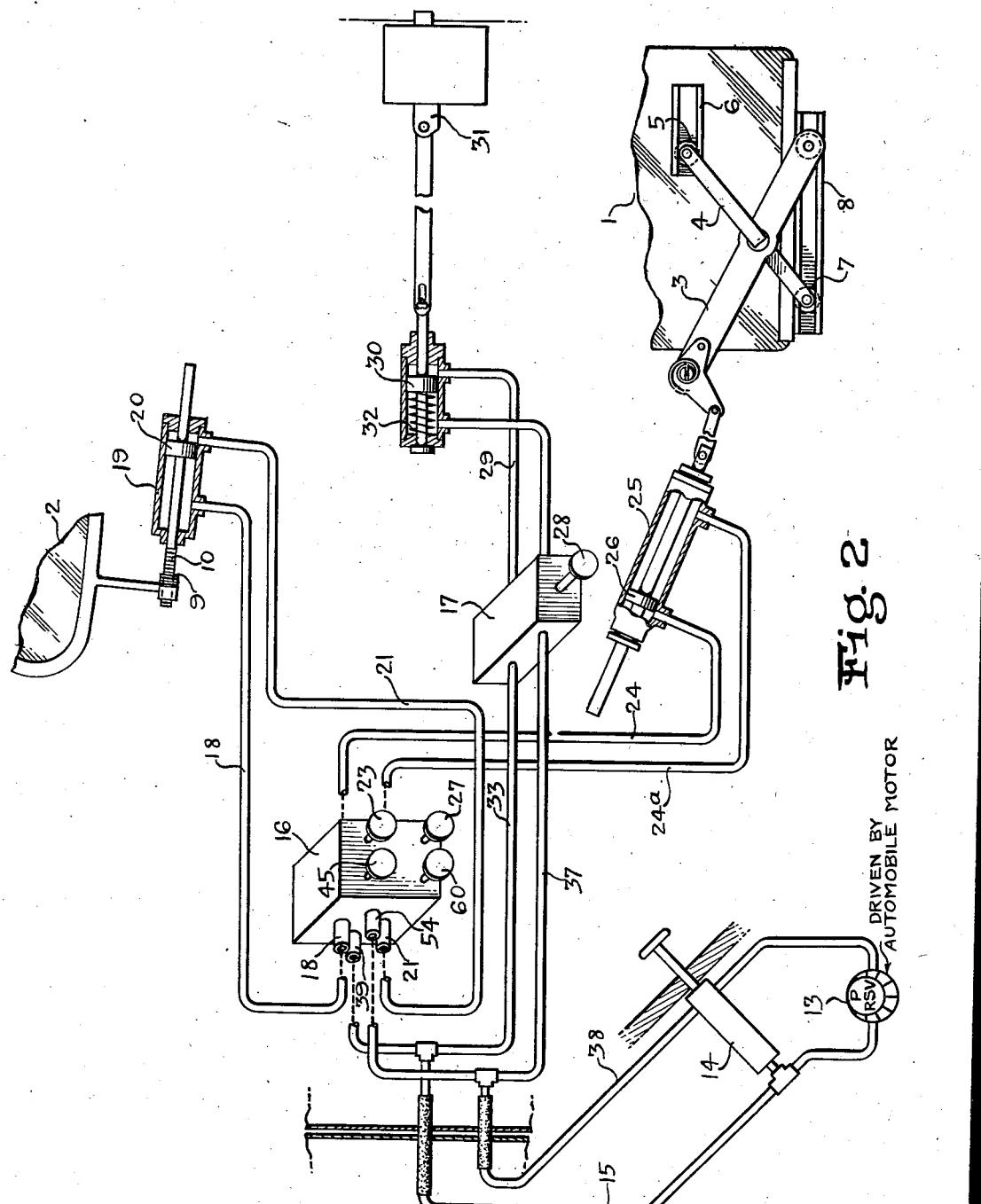
Fig. 2 is a diagrammatic layout of the apparatus.

Now, refer to Fig. 2: A vane pump 13 is driven by the motor of the car. Or, when the motor is not running, the foot pump 14 may be used to force oil up through the line 15 and thence either to the regulator valve casing 16 or the lock valve casing 17. By following the piping leading out of casing 16, it will be seen that, by pressing button 45, the hydraulic pressure may be passed through line 18 to the left hand side of cylinder 19 to force the piston 20 to the right, thereby pulling the rack 10 to the right and rotating the wind wing 2 clockwise. This closes the wind wing. By operating the other valve 60, the oil pressure is sent through conduit 21 to the right hand end of piston 20 to open the wind wing. The wind wing, of course, will stop in its opening movement the instant the pressure is released on the valve.

Likewise, pressure on the right hand valve button 23 sends the pressure through conduit 24 to cylinder 25 and to the left of piston 26 to operate the window regulator arm 3 to raise the sliding window. Pressure on button 27 sends the pressure to the right hand side of piston 26 to lower the regulator arm 3 to the position shown in Fig. 2.

Pressure on the button 28 sends the oil or hydraulic fluid through conduit 29 to the right, returning piston 30, to retract the lock bolt 31. The spring 32 will return the piston as soon as the button is released.

Figure 5:
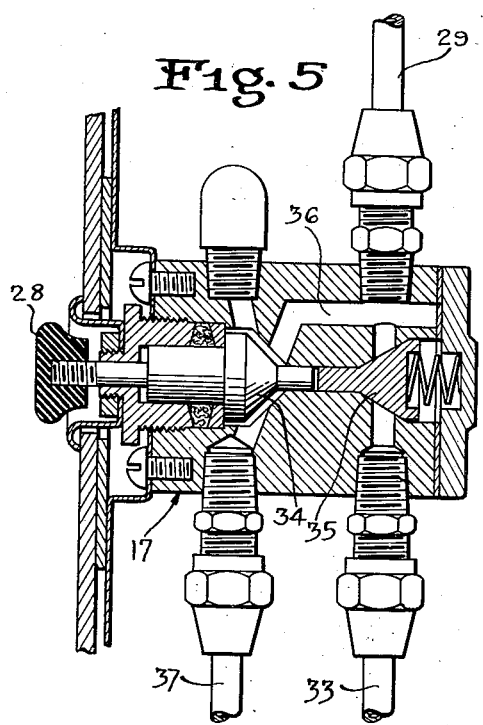
Fig. 5 is a section on the line 5—5 of Fig. 1.
Figure 6:
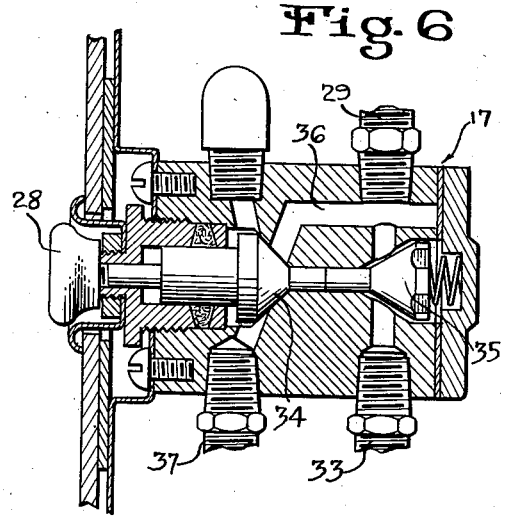
Fig. 6 is a similar view showing the control button pushed inwardly.

Now, turning to Figs. 5 and 6, the valve arrangement for the remote control of the lock will be described. Oil comes in through conduit 33. When button 28 is depressed, the exhaust valve 34 closes passage 36 and opens the intake valve 35. Oil passes from conduit 33 to conduit 29. When the button is released, the spring immediately returns the piston 30 to the right hand position. The oil is forced back to conduit 29, thence through passageway 36 and into the left hand end of the lock control cylinder. During the passage of oil from conduit 33 through passage 29 to the right of piston 30, the oil on the left end side of the piston 30 is forced out around valve 34 and out through conduit 37.

Referring to Figs. 7-10 inclusive, the operation of the two valves that control the regulators can be described. Oil, under pressure, comes through the conduit 39. Suppose that the right hand valve 44 in Fig. 10 is opened, this will mean the pressing on of the left hand button 45 in Fig. 7. This admits the pressure through passageway 40, branch 42, around valve 44, thence through port 46, out passageway 47 and pipe 18 to the left hand end of cylinder 19. The oil at the right hand end of the cylinder has been exhausted through pipe 21 back through passageway 48, thence up through passageway 49 and the vertical passage 50. The exhaust valve 51 is open and the returning oil passes into the vertical passageway 52, then through passageway 53 and out pipe 54 and then through the return pipe 38 out to the pump.

When button 55 is depressed, it lets fluid come through passageway 56 (Fig. 8), through passage 48 and thence out pipe 21 which leads to the right of the piston 20. The oil in front of the piston will pass down through pipe 18 and enters port 47 (Fig. 9), passes through passageway 57 and then out around the exhaust valve 58 into passageway 52 and out 53 to return pipe 54.

The other two buttons 23 and 27, operating in connection with the pipes 24 and 24a, work the same way. So, it is not necessary to describe them nor show the specific passages, as this would only clutter up the drawings and one would have more difficulty in tracing the transmission lines.

Both the sliding window and the ventilating window will be positively locked in any position of adjustment by the presence of hydraulic fluid on both sides of the pistons controlling these members.

I have referred to the circuit for the hydraulic devices as a "panel plate" but this should be given a broad signification as, obviously, the devices themselves might be grouped in any given location on the inside panel of the door. I want the signification of the words "panel plate" to be broad enough to cover such an obvious modification.

I claim:

A power instrument installation for automobile doors comprising a unit panel, means for removably securing the panel in a door, a plurality of fluid operated pistons and cylinders located on the panel and for connection with and power operation of devices in the door such as window regulators for window panels, locks, etc. and one or more control panels having pipe connections with the fluid cylinders and located at any desired position with respect to the unit panel and carrying on the inside valves for the fluid pipes to selectively control the operation of the pistons in the fluid cylinders and thereby control the instrumentalities on the door operated by the same, said valves being controlled by push buttons on the outside of the control panel and arranged to be substantially flush with the inside face of the door, when the control panel is in place.

FLOYD A. COOLEY.